United States Patent [19]

Clyburn

[11] 4,405,107

[45] Sep. 20, 1983

[54] CLAMP SYSTEM FOR TELESCOPING TUBES

[75] Inventor: C. Wayne Clyburn, Cincinnati, Ohio

[73] Assignee: Hamilton Stands, Incorporated, Monroe, Ohio

[21] Appl. No.: 391,176

[22] Filed: Jun. 23, 1982

[51] Int. Cl.³ .............................................. F16L 3/00
[52] U.S. Cl. .................... 248/122; 248/413
[58] Field of Search ............ 248/122, 412, 411, 413, 248/405, 176, 178, 185, 125, 124, 487; 403/104, 109, 110; 24/248 SA, 249 R

[56] References Cited

U.S. PATENT DOCUMENTS

| | | | |
|---|---|---|---|
| 1,380,910 | 6/1921 | Hubbard | 248/487 |
| 2,453,967 | 11/1948 | Browne | 248/122 |
| 2,618,451 | 11/1952 | Campo | 248/122 |
| 2,953,343 | 9/1960 | Heüsner | 252/12 |
| 3,637,172 | 1/1972 | Diesbach | 403/104 |
| 3,647,242 | 3/1972 | Pawsat et al. | 280/298 |
| 3,658,283 | 4/1972 | Martin | 248/122 |
| 4,047,684 | 9/1977 | Kobayashi | 248/122 |
| 4,111,575 | 9/1978 | Hoshino | 403/104 |

Primary Examiner—William H. Schultz
Assistant Examiner—Ramon O. Ramirez
Attorney, Agent, or Firm—Wood, Herron & Evans

[57] ABSTRACT

A novel clamp system for telescoping tubes that is particularly useful with a telescoping centerpost stand adapted to mount, e.g., a music desk or a loud speaker. The novel clamp system is of the split ring type, the split ring being positioned between the inner and outer telescoping tubes, i.e., outside the inner tube but inside the outer tube. Arms of the split ring are sized to extend through a port in the outer tube, those split arms cooperating with the outer tube for preventing significant longitudinal and rotational movement of the clamp relative to the outer tube. An adjustable fastener connects the split ring's arms outside of the outer tube for adjustably tightening and releasing the clamp relative to the inner tube.

18 Claims, 5 Drawing Figures

U.S. Patent    Sep. 20, 1983    4,405,107
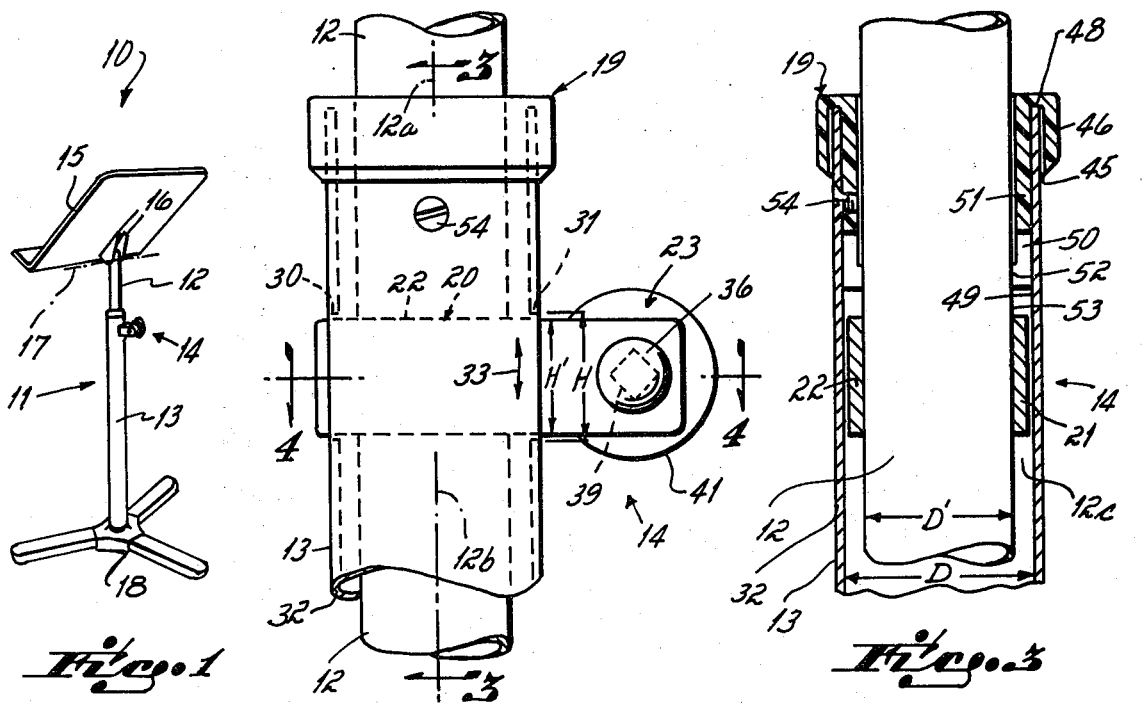
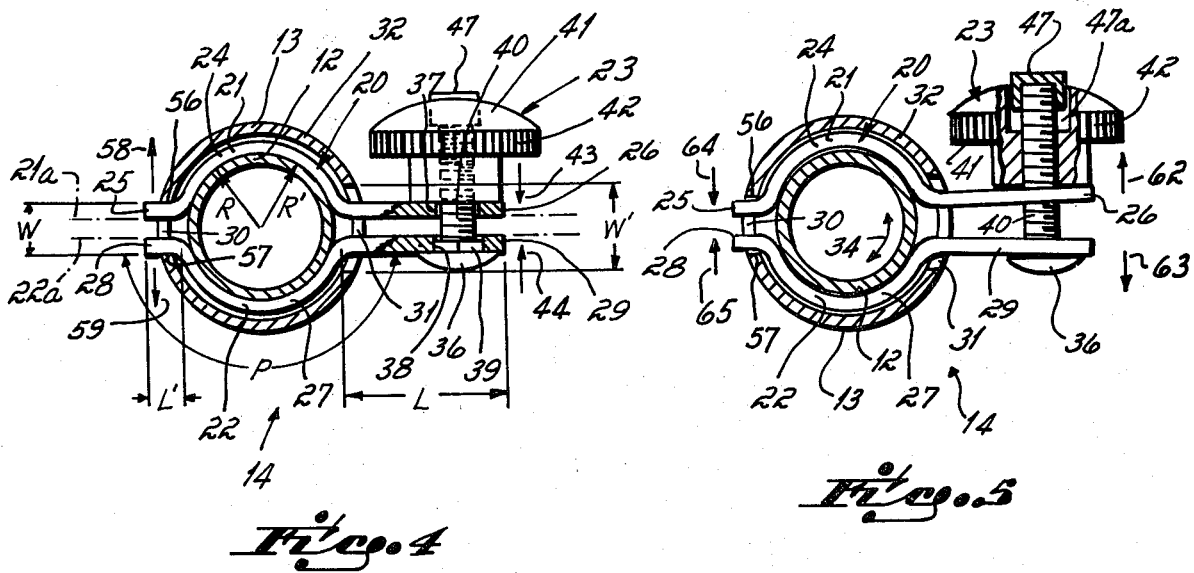

CLAMP SYSTEM FOR TELESCOPING TUBES

This invention relates to clamp systems. More particularly, this invention relates to a clamp system particularly for use with a telescoping centerpost stand.

Stands with telescoping centerposts are very well known to the prior art. One typical type of telescoping centerpost stand is a music stand. A sheet music desk is fixed to the top end of the telescoping centerpost in this type stand, and a base for the stand is fixed to the bottom end of the telescoping centerpost. The telescoping centerpost itself is comprised of an inner top tube and an outer bottom tube which are coaxially aligned, and which are telescopable relative one to the other. The extended or retracted telescoping position of the two centerpost tubes, i.e., the vertical height of the music desk relative to ground, is determined by the user's desires, and is maintained by a clamp system which clamps or locks the telescoping tubes in the desired position. There are, of course, telescoping centerpost type stands which are known to the prior art for other uses. Typically, such stands include speaker stands for loud speakers, camera stands for still picture or movie picture cameras, and vertical height adjustable medical or hospital stands.

In connection with height adjustable stands of the telescoping tube type, one of the primary problem areas with such stands has been the clamp mechanism by which the stand's telescoping tubes are released from fixed position relative one to the other for height adjustment purposes, and thereafter are clamped once again in fixed position relative one to the other when a new height has been selected. While numerous different clamp systems are known for providing this function to the stand's structure, same are often relatively complex, or require relatively tight tolerances, from a manufacturing standpoint and, therefore, are relatively expensive to produce. Another of the primary problems with such stands, and particularly in the case of sheet music stands, has been the fact that the clamp system by which the sheet music desk tube, i.e., the inner top tube, is clamped to the stand base tube, i.e., the outer bottom tube, allows the sheet music desk to jiggle or wobble if the stand is exposed to extraneous vibrations during use. In other words, and if the stand is bumped inadvertently by a musician, the music desk will wobble or jiggle for a relatively long period of time. This vibration induced wobble of the music desk causes a blurring effect of the sheet music's notes to the musician. And, of course, this is very undesirable from the musician's standpoint since it may cause the musician to make mistakes or lose concentration during a musical performance, and may at the least cause momentary eye strain.

Accordingly, it has been one objection of this invention to provide a novel clamp system for telescoping tubes, the clamp system being relatively simple from a structural standpoint and being structured to prevent substantial wobble or jiggle between the tubes when tightened, thereby providing a clamp system that can be produced economically but which can be easily operated and effectively used in a telescoping centerpost stand, e.g., a music stand or a speaker stand.

It has been another objective of this invention to provide a novel clamp system for telescoping tubes, the clamp system being of the split ring type in which the clamp's split rings are positioned interiorly of the outer tube and exteriorly of the inner tube, the split ring's arms extending through a port in the outer tube into assembly with a fastener by which the clamp can be tightened and released about the inner tube, the inner tube being held longitudinally immobile relative to the outer tube when the clamp is tightened about the inner tube by virtue of an interference fit between the split ring's arms and the outer tube.

The clamp system for telescoping tubes of this invention cooperates, of course, with an inner tube and an outer tube. The inner and outer tubes are sized so that a split ring clamp can be disposed interiorly of the outer tube about the inner tube, i.e., between the inner and outer tubes. The split ring clamp, in preferred form, is comprised of two split ring parts, each of which includes an arm that extends outwardly through a port in the outer tube's side wall, thereby providing a slightly loose interference fit between the two clamp parts and the other tube. An adjustable fastener is connected with the two clamp arms exteriorly of the outer tube for selectively tightening and releasing the clamp parts against the inner tube. When the clamp parts are tightened against the inner tube, and because of the interference fit between the clamp parts and the outer tube's port, longitudinal and rotational movement of those parts relative to the outer tube is limited, thereby holding the inner tube in the desired longitudinal position relative to the outer tube. When release of the clamp system is desired to allow telescoping action between the inner and outer tubes, the clamp parts are released from clamping relation with the inner tube by use of the fastener device, thereby allowing the inner tube to telescope relative to the outer tube and to the split ring clamp.

Other objectives and advantages of my invention will be more apparent from the following detailed description taken in conjunction with the drawings in which:

FIG. 1 is a perspective view illustrating a telescoping centerpost stand having a clamp system in accord with the principles of this invention, same being structured for use as a music stand;

FIG. 2 is a side view of the telescoping centerpost and clamp system for the stand shown in FIG. 1;

FIG. 3 is a longitudinal cross-sectional view of the centerpost taken along lines 3—3 of FIG. 2;

FIG. 4 is a transverse cross-sectional view of the centerpost taken along line 4—4 of FIG. 2, the clamp system being shown in the clamping position for preventing the inner and outer tubes from telescoping relative one to the other; and FIG. 5 is a view similar to FIG. 4, but with the clamp system being shown in the release position for allowing the inner and outer centerpost tubes to telescope relative one to the other.

A telescoping centerpost stand 10 in accord with the principles of this invention is shown in FIG. 1. The telescoping centerpost 11 is comprised of an upper inner tube 12 that is telescopable relative to an outer lower tube 13, the tubes being cylindrical and the centerpost being generally vertically oriented relative to ground during use. The centerpost's tubes 12, 13 are held in locked or clamped vertical position as desired during use by clamp system 14.

The top end of the centerpost's inner tube 12 is connectable to the article to be supported, a music desk in the embodiment as shown. The music desk 15 includes a support head 16 that allows the desk to pivot on horizontal axis 17 relative to ground so that the desk may be angled as desired by the user. The telescoping centerpost stand 10 also includes a three foot base 18 to which the centerpost's outer tube 13 is fixed at its bottom end.

The clamp system 14 which is adapted for use with the telescoping tube centerpost 11 is particularly shown in FIGS. 2-5. The clamp system 14 basically includes a split ring clamp 20 and an alignment collar 19. The clamp 20 functions to retain the desired telescoping position of the inner tube 12 relative to the outer tube 13, and the alignment collar 19 functions, in combination with the clamp, to maintain axial alignment of the inner tube's axis 12a with the outer tube's axis 12b so as to prevent wobble or jiggle of the music desk 15 when same is being used by a musician. Note particularly that the inside diameter D of the outer tube 13 is significantly greater than the outside diameter D' of the inner tube 12, thereby providing an annular space 12c within which split ring clamp 20 is received upon assembly with the telescoping tubes 12, 13.

The split ring clamp 20 basically is comprised of two separate clamp parts 21, 22, and a fastener 23. The separate clamp parts 21 includes a generally semi-circular center section 24, and an ear 25 at one end and an arm 26 at the other end of the semi-circular center section. The clamp part 22 also includes a generally semi-circular center section 27, and an ear 28 at one end and an arm 29 at the other end of the semi-circular center section. Each arm 26, 29 is aligned generally in the same plane 21a, 22a with the ear 25, 28 for each clamp part 21, 22, respectively. Also, the arm 26, 29 of each clamp part 21, 22 is of a length L significantly greater than the length L' of the ear 25, 28 for each clamp part 21, 22, respectively, i.e., about four times as long as for each part in the embodiment shown. The semi-circular curved center section 24, 27 of each split ring clamp part 21, 22 has an inside radius R about equal to the outside radius R' of the inner tube 12. And note particularly that the thickness T of the semi-circular section 24, 27 of each split ring clamp part 21, 22 is slightly less than one-half the difference between the outside diameter D' of the inner tube 12 and the inside diameter D of the outer tube 13, thereby providing a slight clearance between the split ring clamp parts 21, 22 and the inner and outer tubes when the split ring clamp 20 is in the release or non-clamping position shown in FIG. 5. It is, of course, because of this nominal clearance that the inner 12 and outer 13 tubes are telescopable relative one to the other when the clamp 20 is in the release position shown in FIG. 5. The peripheral length P of each of the clamp part's center section 24, 27 is such that, when the split ring clamp 20 is in the clamping position shown in FIG. 4, the parts 21, 22 cooperate to clamp securely against the inner tube 12 about substantially its entire outer periphery.

The outer bottom tube 13 is provided, at any point along its length, but preferably adjacent to the top end thereof as shown in FIG. 2, with two rectangular ports 30, 31. The rectangular ports 30, 31 are located diametrically opposite one of the other in the outer tube's side wall 32. Note that the port 30 on one side of the outer tube is of a lesser width W, and that the port 31 on the other side of the outer tube is of a greater width W', the greater width port 31 being about twice as wide as the lesser width port in the embodiment shown. Both of the ports 30, 31 are of a height H only very slightly greater than the height H' of the split ring clamp parts 21, 22. In other words, the split ring clamp parts 21, 22, when assembled with the outer tube, are very limited in longitudinal movement relative to the tubes 12, 13, and can so move when in the relative or non-clamping position only a very nominal amount because the height H of the rectangular ports 30, 31 is only nominally greater than the heigh H' of the split clamp parts 21, 22, thereby effectively limiting, and indeed preventing in the embodiment shown, movement in the longitudinal direction 33 of the split ring clamp relative to the outer tube. However, the width W of the lesser width port 30, as well as the width W' of the greater width port 31, are both significantly wider than twice the thickness T of the clamp ring ears 25, 28 and arms 26, 29 received in those respective ports 30, 31, thereby providing a sloppy or loose interference fit between the clamp parts 21, 22 and the outer tube in a rotational direction 34 when the clamp parts are not clamped to the inner tube.

Assembly of the split ring clamp 20 with the outer tube 13 is preliminary achieved without the inner tube 12 telescoped therein. Initially, a first clamp part 21 is inserted through wide port 31 until that part's ear 25 is seated in opposite port 30, and then the second clamp part 22 is inserted through that same wide port 31 until the other part's ear 28 is also seated in the opposite port 30. When the clamp part's ears 25, 28 are seated in port 30, of course, the clamp part's arms 26, 29 also are seated in port 31. Subsequently the inner tube 12 is telescoped within the clamp parts 21, 22 and the outer tube 13, as shown in FIGS. 4 and 5. With the clamp parts 21, 22 and inner tube 12 so positioned in telescoped relation with outer tube 13, the clamp parts 21, 22 cannot be inadvertently withdrawn or removed through ports 30 or 31 from the assembled relation with the telescoped tubes 12, 13.

A fastener 23 is provided by which the clamp parts 21, 22 can be selectively clamped against the inner tube 12, and released from clamping position with the inner tube, as desired by the user. The fastener 23 shown includes a carriage bolt 36 which extends through bores 37, 38 in respective arms 26, 29 of the clamp 21, 22. Bore 38 in arm 29 is of a square cross section to receive square shank section 39 of the carriage bolt 36, thereby preventing rotation of the bolt relative to the clamp's arms 26, 29. The bolt's threaded shaft 40 is connected with an internally threaded knob 41 having knurled edge 42. Rotation of the knob 41, of course, allows the clamp parts' arms 26, 29 to be drawn toward one another, as shown by phantom arrows 43, 44 into clamping position for the split ring clamp 20. The knob 41 while free to traverse the threads of bolt 36 is retained on the bolt. To this end, an internally threaded end cap 47 is threaded onto the shaft 40 of bolt 36. A counter bored recess 47a is provided in the knob 41, the recess being of sufficient depth to permit the knob 41 to traverse the threads of shaft 40 and release the clamp 20. The bottom of recess 47a will engage the end cap 47 and preclude further movement of knob 41.

The tube alignment collar 19 that cooperates with the clamp 20 is shown in FIG. 3. The alignment collar 19 includes a downwardly directed annular seat 48 structure to cause the collar to be fit in zero clearance fashion with the inside surface 49 of the outside tube 13 at the top end thereof and the outer surface 53 of the inner tube 12. To this end the collar 19 includes a plurality of shear ridges 45 axially oriented and angularly disposed on the inner surface of a flange 46. These ridges 45 are sized to accomodate the manufacturing tolerance of outer tube 13. That is to say, an outer tube manufactured on the upper limits of its tolerance will shear a portion of these ridges in assembly and provide a friction fit engagement. Conversely, a tube manufactured to teh minimum diameter of its limits will frictionally engage the crown of the ridge 45. The alignment collar 21 also includes a series of depending legs 50 which depend from the inside flange 51 of that collar. Each of the legs 50, at the bottom end thereof, is provided with an inwardly directed contact foot 52. The contact feet 52 of the alignment collar's legs 50 are sized so as to provide a zero clearance fit between the collar 19 and the outer surface 53 of the inner tube 12. It is this zero clearance fit between the alignment collar 19 and the inner tube 12 at the top end of the outer tube 13, in combination with the lateral stability provided to the inner tube 12 relative to the outer tube 13 by the split ring clamp 20 as explained in greater detail below, that prevents significant wobble or jiggle of the music stand's desk 15 if it is inadvertently touched or vibrated during use. To insure that the collar 19 remains fixed at the upper end of tube 13, a screw 54 is inserted through in tube 13 and threaded into a suitable aperture in flange 51.

Use of the clamp system 14 is particularly shown in FIGS. 4 and 5. When the split ring clamp 20 is in the clamping position as shown in FIG. 4, the knob 41 is tightened or threaded onto carriage bolt 36 for drawing the clamp part's arms 26, 29 together (as shown by phantom arrows 43, 44) to generate clamping forces on the inner tube 12 by the clamp's center section 24, 27, thereby clamping the clamp parts 21, 22 to the inner tube 12. Also, this drawing together in directions 43, 44 of the clamp's arms 26, 29 by the fastener device 23 when it is tightened causes the clamp's ears 25, 28 to be wedged or forced outwardly against side edges 56, 57 of the rectangular port 30 as indicated by phantom arrows 58, 59 in opposite direction one to the other. Accordingly, and when in clamping position on the inner tube 12, the split ring clamp 20 limits, and in the embodiment shown prevents, longitudinal movement 33 of the inner tube 12 relative to the outer tube 13 since the clamp's ears 25, 28 and arms 26, 29 are received in the outer tube's ports 30, 31, and also limits, and in the embodiment shown prevents, rotational movement 34 of the inner tube relative to the outer tube due to the wedged forces 58, 59 exerted by the clamp's ears 25, 28 against the outer tube. This split ring clamp 20 and zero clearance alignment collar 19 cooperate, in a music stand 10 structure, to eliminate significant wobble or jiggle of the top tube 12 relative to the bottom tube 13 of the centerpost 11.

When release of the split ring clamp is desired so that repositioning of the top tube 12 relative to the bottom tube 13, i.e., so that repositioning of the music desk 15 can occur, the clamp's knob 41 is simply loosened or unscrewed relative to the carriage bolt 36, see FIG. 5. This allows the clamp's arms 26, 29 to move away from one another as shown by phantom arrows 62, 63 in FIG. 5, and this in turn allows the clamp's ears 25, 28 to move toward one another as shown by phantom arrows 64, 65 (i.e., eliminates wedging forces 58, 59). The outer or release limits of the clamp parts' movements as shown by phantom arrows 62–65 is, of course, established by contact of the clamp parts' semi-circular center sections 24, 27 with the inside surface 49 of the outer tube 13. This movement of the clamp parts 21, 22 toward contact with the outer tube's inside surface 49 when the fastener 23 is released allows the inner tube 12 to telescope relative to the outer tube 13 so that the music desk 15 can be repositioned as desired by the user. When the music desk 15 has achieved the new desired height position, the fastening device 35 is simply retightened so as to induce the clamping forces shown by phantom arrows 43, 44 and the wedging forces shown by arrows 58, 59 which, of course, once again retains the music desk in desired height relative to ground.

There are a series of advantages of the split ring clamp 20 relative to those clamps known to the prior art. First, the combination of the clamp 20 and the alignment collar 19 substantially minimizes jiggle or wobble of the inner tube 12 relative to the outer tube 13 and, therefore, substantially eliminates any blurring of the sheet music notes to a musician's eyes when the clamp system is used in a music desk 10. Second, no separate fitting type component is required to connect the clamp 20 to the outer tube 13, i.e., the clamp is simply received and held in position by means of opposed closed periphery ports 30, 31 in the outer tube's wall 32, thereby producing economy in manufacture. Third, and in any telescoping tube environment, the clamp 20 can be positioned anywhere along the outer tube's length, i.e., it need not be provided only at one end of the outer tube 13, thereby providing flexibility in its end use. Fourth, no flexing of the outer tube 13 against the inner tube 12, or of the outer tube relative to the inner tube, is required to achieve a final clamp that prevents telescoping action between the two tubes, there simply being provided a clamp 20 that clamps tightly against but does not partially collapse the inner tube, thereby maintaining the structural integrity of the tubes throughout their lengths. Fifth, and from an aesthetic standpoint, the split ring clamp 20 is pretty much hidden from a casual observer's view since by far the majority of the split ring clamp structure is located interiorly of the outer tube 13, it really being only the fastener device's knob 41 and the clamp's arms 26, 29 which are exposed to a casual observer's view.

Having described in detail the preferred embodiment of my invention, what I desire to claim and protect by Letters Patent is:

1. A clamp system to clamp inner and outer telescoping tubes in a desired position relative one to the other, said clamp system comprising
    structure defining at least one port in said outer tube, said port being positioned between the ends of said outer tube,
    at least one clamp part disposed interiorly of said outer tube and exteriorly of said inner tube, said clamp part being movable into and out of clamping position relative to said inner tube, said clamp part extending outwardly through said port in said outer tube, and,
    a fastener connected exteriorly of said outer tube with said clamp part, said fastener cooperating with said clamp part for selectively tightening and releasing said clamp part against said inner tube, longitudinal movement of said inner tube relative to said outer tube being limited when said clamp part is tightened against said inner tube due to interference of said clamp part with said outer tube's port structure, and longitudinal movement of said inner tube relative to said outer tube and said clamp part being permitted when said clamp part is released from tightened position against said inner tube.

2. A clamp system as set forth in claim 1, rotational movement of said inner tube relative to said outer tube also being limited when said clamp part is tightened against said inner tube due to interference of said clamp part with said outer tube.

3. A clamp system as set forth in claim 2, longitudinal and rotational movement of said inner tube relative to said outer tube being prevented when said clamp part is tightened against said inner tube due at least in part to said clamp part also being tightened against said outer tube.

4. A clamp system as set forth in claim 3, said clamp part being wedged in place within a port in said outer tube to prevent rotational movement of said inner tube relative to said outer tube when said clamp part is tightened about said inner tube.

5. A clamp system as set forth in claim 1, said clamp system comprising structure defining two ports in said outer tube, said two ports being positioned between the ends of said outer tube, and said two ports being spaced one from the other around the circumference of said outer tube, and two clamp parts disposed interiorly of said outer tube and exteriorly of said inner tube, each of said clamp parts having an arm at one end, an ear at the other end, and an arcuate center section adapted to partially extend around the circumference of said inner tube, said clamp parts' arms extending outwardly through one of said ports in said outer tube and said clamp parts' ears extending outwardly through the other of said ports in said outer tube, said clamp parts' ears being wedged outwardly against said ears' port when said clamp parts' arms are forced toward one another by said fastener, forcing of said clamp parts' arms toward one another by said fastener simultaneously clamping said clamp parts about said inner tube and wedging said clamp parts against said outer tube.

6. A clamp system as set forth in claim 5, the length of said arms being greater than the length of said ears, said fastener being connected between said arms.

7. A clamp system as set forth in claim 6, said arm and said ear of each clamp part being generally co-planar one with the other.

8. A clamp system as set forth in claim 7, the width of said ears' port being less than the width of said arms' port.

9. A clamp system as set forth in claim 5, said fastener comprising a threaded bolt that extends through both of said arms, and a knob received on said bolt, said knob being rotatable to selectively move said arms toward and away from one another, said clamp parts being moved toward clamping relation with said inner tube when said arms are moved toward one another and away from clamping relation with said inner tube when said arms are moved away from one another.

10. A clamp system as set forth in claim 5, said ports being generally diametrically opposed relative one to the other on opposite sides of said outer tube.

11. A stand comprising an article support head and a base, a centerpost having inner and outer tubes telescopable relative one to the other, one of said tubes being connected to said article support head and the other of said tubes being connected to said base, and a clamp system to clamp said tubes in desired telescoping position relative one to the other, said clamp system comprising at least one clamp part positionable interiorly of said outer tube and adapted to clamp against the exterior of said outer tube, structure defining a port in said outer tube between the ends of said outer tube, said clamp part extending outwardly of said outer tube through said port, and a fastener connected with said parts exteriorly of said outer tube, said fastener being selectively adjustable to tighten said clamp part against said inner tube and to release said clamp art from said inner tube, longitudinal movement of said inner tube relative to said outer tube being limited due to interference of said clamp part with said port when said clamp part is clamped against said inner tube, and longitudinal movement of said inner tube relative to said outer tube and to said clamp part being permitted when said clamp part is not clamped against said inner tube.

12. A clamp as set forth in claim 11, rotational movement off said inner tube relative to said outer tube alos being limited when said clamp part is tightened against said inner tube due to interference of said clamp part with said outer tube.

13. A stand as set forth in claim 12, longitudinal and rotational movement of said inner tube relative to said outer tube being prevented when said clamp part is tightened against said inner tube due at least in part to said clamp part also being tightened against said outer tube.

14. A stand as set forth in claim 13, said clamp part being wedged in place within a port in said outer tube to prevent rotational movement of said inner tube relative to said outer tube when said clamp part is tightened about said inner tube.

15. A stand as set forth in claim 11, said clamp system comprising structure defining two ports in said outer tube, said two ports being positioned between the ends of said outer tube, and said two ports being spaced one from the other around the circumference of said outer tube, and two clamp parts disposed interiorly of said outer tube and exteriorly of said inner tube, each of said clamp parts having an arm at one end, an ear at the other end, and an arcuate center section adapted to partially extend around the circumference of said inner tube, said clamp parts' arms extending outwardly through one of said ports in said outer tube and said clamp parts' ears extending outwardly through the other of said ports in said outer tube, said clamp parts' ears being wedged outwardly against said ears' port when said clamp parts' arms are forced toward one another by said fastener, forcing of said clamp parts' arms toward one another by said fastener simultaneously clamping said clamp parts about said inner tube and wedging said clamp parts against said outer tube.

16. A clamp system as set forth in claim 15, the length of said arms being greater than the length of said ears, said fastener being connected between said arms, said arm and said ear of each clamp part being generally co-planar one with the other, and the width of said ears' port being less than the width of said arms' port.

17. A clamp system as set forth in claim 15, said fastener comprising
- a threaded bolt that extends through both of said arms, and
- a knob received on said bolt, said knob being rotatable to selectively move said arms toward and away from one another, said clamp parts being moved toward clamping relation with said inner tube when said arms are moved toward one another and away from clamping relation with said inner tube when said arms are moved away from one another.

18. A clamp system as set forth in claim 11, said clamp system further comprising
- an alignment collar connected with said outer tube at that end which receives said inner tube, the inside diameter of said outer tube having a zero clearance with said collar and the outside diameter of said inner tube having a zero clearance with said collar, said collar thereby cooperating with said clamp system to prevent significant wobble or jiggle between the inner and outer tubes if said article support head is inadvertently subjected to extraneous vibration.

* * * * *

UNITED STATES PATENT AND TRADEMARK OFFICE
CERTIFICATE OF CORRECTION

PATENT NO. : 4,405,107

DATED : September 20, 1983

INVENTOR(S) : C. W. Clyburn

It is certified that error appears in the above-identified patent and that said Letters Patent is hereby corrected as shown below:

At column 1, line 55, "objection" should be --objective--.

At column 4, line 1, "relative" should be --release--.

At column 4, line 4, "heigh" should be --height--; between "split" and "clamp" insert --ring--.

At column 4, line 38, between "clamp" and "21", insert --parts--.

At column 5, line 28, "section" should be --sections--.

At column 5, line 43, "wedged" should be --wedging--.

At column 7, line 65, "said-tubes" should be --said tubes--.

At column 8, line 14, "art" should be --part--.

At column 8, line 24, "alos" should be --also--.

Signed and Sealed this

Third Day of January 1984

[SEAL]

Attest:

GERALD J. MOSSINGHOFF

*Attesting Officer*  *Commissioner of Patents and Trademarks*